Patented June 8, 1954

2,680,703

UNITED STATES PATENT OFFICE 2,680,703

PROCESS OF PRODUCING GLYCERINE

Benjamin T. Brooks, Old Greenwich, Conn., assignor to Glycerine Corporation of America, Inc., New York, N. Y., a corporation of Delaware No Drawing. Application July 22, 1950, Serial No. 175,483

1 Claim. (Cl. 195—38)

This invention relates to methods of producing and recovering glycerine from fermentable sugars and is directed particularly to methods of recovery of glycerine from fermented molasses the impurities of which render the recovery of glycerine especially difficult.

The present application is a continuation in part of copending application Serial No. 69,030, filed January 3, 1949, which has issued as Patent No. 2,614,964, dated October 21, 1952.

It is well known that when fermentable sugars in the form of molasses are fermented by yeast under alkaline conditions up to 25% of the sugar is converted to glycerine. However, separation of the glycerine thus produced from the remaining fermentation products has never been successfully carried out because of the large amount of solids, yeast, gums and calcium salts present in the fermentation slops. The solids and gums are present in greater amount than the glycerine and frequently equal 50% or more of the concentrated or evaporated residues. When the fermentation is completed the alcohol is first distilled off and when the resulting alcohol-free residues are concentrated by distilling off water, the dead yeast and other solid matter deposits on the heating surfaces, resulting in some decomposition of the glycerine and gums and necessitating frequent shut downs for cleaning the apparatus. Attempts to separate the glycerine by vacuum distillation of such thick, heavy and viscous material result in caking of the solids rendering satisfactory separation of the glycerine impossible. Objectionable foaming also tends to occur and there is danger of bacterial putrefaction of the dead yeast.

The yeast cannot be easily filtered from the fermentation residues, either before or after distilling off the alcohol, even with the addition of relatively large amounts of filter aid such as infusorial earth since unpurified molasses contains gummy and gelatinous impurities which quickly plug a filter. The use of filter aids adds to the cost and renders the separated yeast unfit for use as cattle food.

Even when the yeast is filtered from the fermentation products the glycerine-containing residue still includes substantially all of the gums and calcium salts which were contained in the original molasses. The presence of such impurities in the glycerine-containing residue precludes effective recovery of the glycerine by distillation since the gums decompose to black material and decomposition products which contaminate the glycerine. They also deposit on the heating coils and the large amount of inorganic salts present promote decomposition of the glycerine. The foaming difficulties are also encountered. The recovery of glycerine from such mixtures by the action of solvents also is impractical because the solvents suitable for this purpose are also solvents for the gums and to some extent for the salts in the glycerine-containing residue.

It has been proposed to recover glycerine from fermentation residues by dialysis but such processes require a relatively high concentration of the glycerine for successful operation and the operation of concentrating the fermentation residues or so-called slops is attended with the difficulties already mentioned and results in concentration of the solid matter, yeast, gums and salts to such extent that a black semi-solid mass is produced which does not flow freely and tends to plug the tubes of the dialyzer impeding its action and sometimes stopping the operation altogether.

In accordance with the present invention these difficulties and objections to methods of the prior art are overcome by a series of steps wherein the molasses is first treated prior to fermentation with suitable agents for removing the calcium salts and a large proportion of the gums therefrom. After fermentation the yeast is separated from the glycerine-containing fermentation products prior to dialyzing the liquid. Further the invention includes steps for effectively increasing the concentration of the glycerine in the fermentation residue freed from yeast and most of the calcium salts and gums without a corresponding increase in the gums, salts and impurities contained in the molasses. The dialysis operation on such concentrated and purified material can then be carried out efficiently. The process further serves to improve the quality of the yeast removed from the fermentation products providing an improved grade of cattle food.

One of the objects of the invention is to provide an improved method for the production of glycerine from molasses.

Another object of the invention is to provide a novel method for carrying out fermentation processes for the production of glycerine.

A further object of the invention is to provide a method wherein molasses is treated to remove most of the gums and calcium salts therefrom prior to fermentation under alkaline conditions.

Another object of the invention is to provide novel methods of recovering glycerine from fermentation products by dialysis, thus recovering a dilute aqueous solution of glycerine, substantially free from coloring matter and gums, and in a state of purity in which the glycerine may readily be distilled without decomposition.

These and other objects and features of the invention will appear from the following description in which a typical example is cited for the purpose of indicating the nature of the present invention but without tending to limit the scope of the invention thereby.

The usual molasses employed for producing glycerine contains approximately 45 to 55% of fermentable sugars together with large amounts of gums and calcium salts. The calcium salts and the major part of the gums are removed by treating the molasses prior to fermentation with a suitable agent which serves to precipitate the calcium salts and thereby bring down the gums contained in the molasses with the precipitate. The resulting purified molasses may be diluted as an incident to such purification or may be further diluted to produce a liquor containing about one and one-half pounds of fermentable sugars per gallon. The pH value of the solution is then adjusted to about 7.5 rendering it mildly alkaline whereupon the solution is fermented with yeast converting from 20 to 25% of the sugars to glycerine. The balance of the sugars are largely converted to alcohol.

Most of the gums having been removed in the initial purification of the molasses, the yeast is readily filtered from the resulting fermentation residue yielding a solution containing about 4% of glycerine. The alcohol is then distilled off from the solution and additional molasses and yeast are added to the glycerine-containing residue without further dilution. The mixture is then purified as before to remove calcium salts and most of the gummy substances. The alkalinity of the solution is then adjusted to a pH of 7.5 and fermented again. The operation may be repeated two or three times to produce a solution which is high in glycerine content and substantially free of calcium salts and gums. This method of operation effects a great economy in the amount of water to be evaporated in the concentration step, for a given amount of glycerine. The solution is then concentrated by evaporation at reduced pressures. Because of the purification and filtration steps employed the concentration of glycerine does not result in a corresponding increase of solids, gums, and salts in the solution. The caking of solids on the heating coils is avoided and foaming of the solution due to the presence of gums and other impurities is eliminated. Moreover, the danger of bacterial putrefaction of the dead yeast is overcome.

The resulting concentrated glycerine-containing solution is then dialyzed to recover substantially 90% of the glycerine produced by fermentation.

In order to illustrate typical practice in accordance with the present invention the following method is cited by way of example but not by way of limitation.

One thousand gallons of molasses containing 50% of fermentable sugar are diluted with 3000 gallons of water. Calcium salts contained in the molasses together with the major proportions of the gums are then precipitated. Such precipitation may be effected by the use of sulfuric acid, sodium phosphate, phosphoric acid, sodium silicate or other suitable agents capable of precipitating the calcium salts. The amount of the precipitating agent used in any case will depend upon the amount of calcium salts present and the amount and character of other impurities contained in the molasses employed and should be determined in each instance by analysis or preliminary test to insure precipitation of all of the calcium present. The solution after treatment may be heated or boiled for a short time and filtered while hot to separate the calcium salts and precipitated or adhering gums and impurities. In a typical case 150 pounds of sodium phosphate are added to the solution containing 1000 gallons of molasses. The solution is then boiled for three minutes and filtered while hot.

The solution thus obtained contains approximately 1.5 pounds of sugar per gallon and is then rendered slightly alkaline by the addition of about 200 pounds of sodium carbonate or until the pH value is about 7.5. In the alternative, 280 pounds of potassium carbonate may be used. The slightly alkaline solution is then fermented with yeast at about 85 to 90° F. More sodium or potassium carbonate may be added as the fermentation proceeds to maintain the pH value of the solution at about 7.5.

When the fermentation is completed, as indicated by rapid decrease in the evolution of carbon dioxide and the tendency of the yeast to settle quickly at the bottom of the vessel, the contents of the tank are filtered through a filter press. The filtrate is pumped to a conventional alcohol still or beer still where the alcohol is removed by distillation. The distillation is preferably carried out by closed steam in order to avoid dilution of the residue which contains about 4% of glycerine.

The undiluted solution is then fortified with a second charge of 1000 gallons of molasses and purified as previously described to remove some of the gums and calcium salts. The fortified solution is then fermented with fresh yeast repeating the operations as described above. Three successive fermentation operations are carried out whereby the concentration of the glycerine in the residue after distillation of the alcohol is increased. Three such fermentations and successive operations as described, yielded a dark colored but clear solution containing about 3,600 pounds of glycerine. The yield or proportion of glycerine will vary somewhat with the alkalinity of the solution and the amount of fresh yeast added to each fermentation step. It will be understood also that the yield or proportions of glycerine will vary somewhat with different strains of yeast. The clear dark colored solution from the three fermentation and filtration steps just described was then concentrated by distillation under reduced pressure to produce a solution containing about 20 to 25% of glycerine. When thus concentrated the solution which is free from yeast and greatly reduced in gum content is suitable for separation of the glycerine by dialysis.

In carrying out the dialyzing operation the glycerine-containing solution is passed in counter-current relation with the pure water which is passed through dialyzing equipment so that the most concentrated dialyzate will be presented to the most concentrated glycerine-containing solution and the solution nearly depleted in glycerine is presented to the entering water. The dialyzing operation may be carried out at an elevated temperature, say 150° to 200° F., as a safe-guard against bacterial action on the cellulose membranes of the dialyzer. The solution recovered by dialysis contains about 4% of glycerine and about 90% of the glycerine present in the concentrated fermentation product. It may be further concentrated by conventional methods such as evaporation and final distillation under reduced pressure. The method described yields about 3000 pounds of purified glycerine.

It will be understood that the purification and filtration steps carried out as described make it possible to perform more than three successive purification and fermentation steps without dilution of the molasses or solution by the addition of water thereto. Moreover, some of the gums which were not precipitated in the first purification step may be brought down in a second or third precipitation operation. The concentration of the glycerine in the residue is increased with each succeeding fermentation step and a solution containing the desired amount of glycerine for the dialyzing operation can be obtained with but limited distillation of water therefrom. However, if desired, the molasses may be purified prior to addition to the fermentation residue from a preceding operation without departing from the process of the present invention. In fact, being able to accomplish more than one or two fermentation steps is one of the advantages of the sequence of operations of the present invention.

The filtration of the yeast prior to partial distillation to remove alcohol may be carried out by means of a filter press using filter paper or filter cloth of fine porosity, or a continuous rotary type of filter can be employed. When the yeast cake is not to be used as food, it is advantageous to add infusorial earth, or similar material as a filter aid in amounts equal to about 10 to 40% of the yeast thus removed. Filtration of the yeast prior to alcohol distillation makes it possible to use the yeast thus recovered in a subsequent fermentation, thus effecting a substantial economy in the operation. Furthermore, the steps of purifying the molasses prior to fermentation results in greatly facilitating the filtration of the yeast since the gums and proteins if not largely removed in the initial purification operation quickly plug the filter with slimy material.

While only one specific example of a method embodying the present invention has been described it will be apparent that numerous changes and modifications may be made without departing from the spirit of the invention. Therefore it should be understood that the example cited is intended for the purpose of illustration only and is not intended to limit the scope of the invention.

I claim:
1. The method of producing glycerine from molasses which comprises the steps of diluting molasses with about three times its volume of water, treating the molasses with sodium phosphate in amount sufficient to precipitate substantially all of the calcium salts contained therein whereby gums contained in the molasses are simultaneously carried down, separating the purified molasses from the precipitate, fermenting the purified molasses with yeast under alkaline conditions, separating alcohol and yeast from the fermentation products, adding unpurified and undiluted molasses to the residue, repeating the steps of precipitation, separation, adding yeast to the enriched liquid, repeating the steps of fermentation and alcohol and yeast removal to increase the glycerine content of the residue without substantial increase of water, subjecting the residue to heating under reduced pressure to remove water and increase the glycerine content thereof to 20 to 25%, passing the resulting concentrate and water in counter-current relation on opposite sides of a dialyzing membrane to separate glycerine from the concentrate, and separating glycerine from the solution thus obtained, by fractional distillation.

References Cited in the file of this patent

UNITED STATES PATENTS

| Number | Name | Date |
| --- | --- | --- |
| 1,193,951 | Lasloffy | Aug. 8, 1916 |
| 1,642,929 | Kusserow | Sept. 20, 1927 |
| 1,698,800 | Ludecke | Jan. 15, 1929 |
| 1,884,272 | Sak | Oct. 25, 1932 |
| 1,936,497 | Carothers | Nov. 21, 1933 |
| 2,187,990 | Steinacker | Jan. 23, 1940 |
| 2,390,779 | Cornwell | Dec. 11, 1945 |
| 2,437,939 | Cornwell | Mar. 16, 1948 |
| 2,614,964 | Brooks | Oct. 21, 1952 |

FOREIGN PATENTS

| Number | Country | Date |
| --- | --- | --- |
| 551,428 | Great Britain | Feb. 22, 1943 |
| 318,297 | France | 1902 |